Aug. 18, 1964

J. W. ANDERSON 3,144,705

METHOD OF MAKING A PULLEY STRUCTURE

Original Filed Oct. 22, 1959

INVENTOR.
JOHN W. ANDERSON

BY Kenneth E. Walden
Charles S. Penfold
ATTORNEY

United States Patent Office 3,144,705
Patented Aug. 18, 1964

3,144,705
METHOD OF MAKING A PULLEY STRUCTURE
John W. Anderson, 578 Broadway, Gary, Ind.
Original application Oct. 22, 1959, Ser. No. 848,031, now Patent No. 3,059,487, dated Oct. 23, 1962. Divided and this application Feb. 26, 1962, Ser. No. 175,898
4 Claims. (Cl. 29—159)

This invention relates to motion-converting devices and more specifically to an improved pulleylike member for use in converting linear motion to oscillatory motion.

This application is a division of my copending application Serial No. 848,031, filed October 22, 1959, now Patent No. 3,059,487, issued October 23, 1962.

It has long been conventional practice to manufacture pulleys by a die-casting process or by a stamping operation. When the stamping method is used, two mating parts are formed from sheet metal, which parts are assembled together face to face in such a way that a cable or the like passing around the periphery of the pulley is disposed between the flared outer portions of the mating parts. This last-mentioned form of pulley has many disadvantages even though it is considered to be a highly desirable and inexpensive way of making a pulley. The chief disadvantage lies in the fact that the cable nests in the depression created by the face-to-face fastening of the mating parts of the pulley such that a reasonable load on the cable wedges the cable between the mating parts thereby stopping any further relative movement between the cable and pulley. Even though the cable might not fail, it becomes frayed due to the excessive pinching and wedging of the parts. When the cable enters and leaves the surface of the pulley in the general vicinity of the same side of the pulley, the separate reaches of the cable abrade one another causing further fraying that contributes to breaking of the cable.

In my U.S. Patent 2,901,764, issued September 1, 1959, a circular pulleylike member is illustrated for converting the reciprocating linear motion of a motor-driven link member to the oscillatory motion of the shaft and wiper arm used on the windshield of current-type automobiles. The pulley illustrated in that patent is shown as circular in shape, although it is within the context of the patent that the pulley could be of some shape less than a full circle as long as the operative peripheral portion is substantially smoothly curved in shape. In my said patent, a pair of grooves are formed about the periphery of the pulley such that one reach of a cable member is seated in one groove and another adjoining reach of the cable is switched over and is seated in the other groove whereby the cable encircles the pulley. As the respective reaches of the cable enter and leave the pulley, they pass each other in spaced relationship so as not to come in contact with and abrade each other. The forming of the parallel grooves in the peripheral surface of the pulley adds considerable expense to the cost of production of the pulley.

It is, therefore, a principal object of this invention to provide an improved pulleylike structure that overcomes the disadvantages of the prior art and at the same time maintains the more desirable features thereof.

It is an object of this invention to provide an improved pulleylike structure made of relatively inexpensive stamping members.

It is a further object of this invention to provide an improved pulleylike structure wherein the two body portions are identical and made from the same die.

It is still a further object of this invention to provide an improved pulleylike structure wherein the circumference of the pulleylike structure does not define a full circle, ellipse or the like, but rather is cut off beyond that portion that is not needed for operation of the resulting system.

And a still further object of this invention is to provide a pulleylike structure having only a partially circular shape or a partially elliptical shape or the like, which structure requires less clearance space for installation and operation in a system.

It is another object of this invention to provide an improved pulleylike structure having a separate race member that is inexpensive to manufacture, simple to install in the pulleylike structure, and highly efficient in use.

It is still another object of this invention to provide an improved race member for a pulleylike structure that can be formed with any number of spaced cable receiving channels or grooves for maintaining overlapping reaches of a cable out of abrading contact with each other.

And another object of this invention is to provide an improved race member for a pulleylike structure that has a novel retaining means for positioning said race member relative to the body of the pulleylike structure.

Other objects and advantages of the invention will become apparent after the description hereinafter set forth is considered in conjunction with the drawing annexed hereto.

Figure 1:
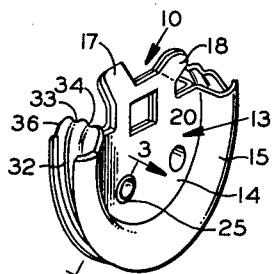
FIGURE 1 is a perspective view of a pulleylike member encompassing the features of my invention.
Figure 2:
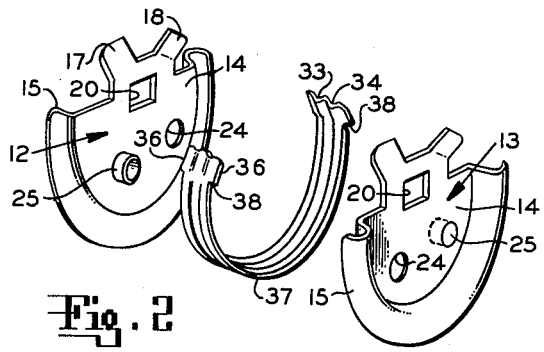
FIGURE 2 is a blown-apart perspective view of the elements of my invention as illustrated in FIGURE 1.
Figure 3:
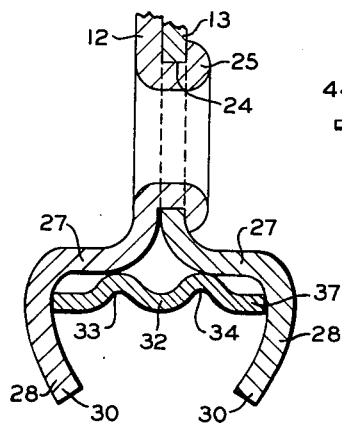
FIGURE 3 is an enlarged cross-sectional view taken along the lines 3—3 of FIGURE 1.
Figure 4:
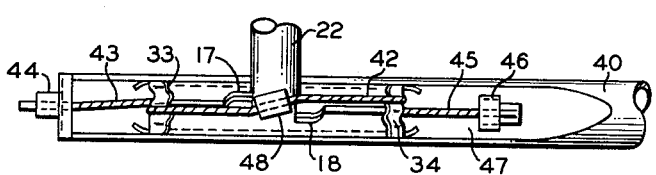
FIGURE 4 is a top plan view of my invention as used in conjunction with a reciprocating link member, as shown further in FIGURE 6.
Figure 5:
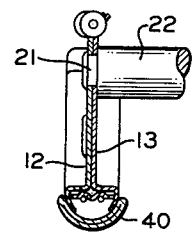
FIGURE 5 is a cross-sectional view taken along the lines 5—5 of FIGURE 6.
Figure 6:
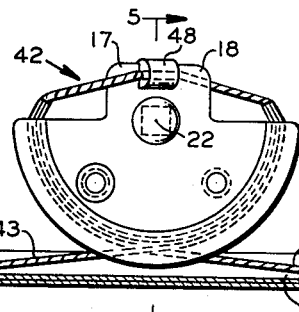
FIGURE 6 is a side elevational view partially in section of my invention shown in connection with a reciprocating link member.
Figure 7:
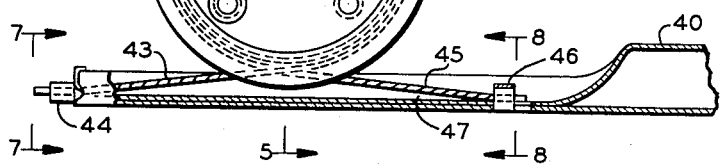
FIGURE 7 is a view taken along the lines 7—7 of FIGURE 6.
Figure 7:
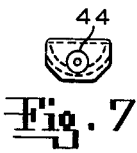
Figure 8:
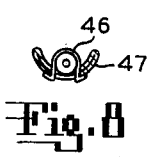
FIGURE 8 is a cross-sectional view taken along the lines 8—8 of FIGURE 6.

Referring to the drawings and particularly FIGURES 1–3 thereof, the numeral 10 designates an assembled pulleylike member without the associated cables adapted for use therewith. The pulleylike member 10 is comprised of a pair of identical mating parts 12 and 13, each part having a flat body portion 14 formed of sheet metal or the like to which an annular flange 15 is integrally formed about the periphery thereof. A pair of oppositely offset upwardly extending ears 17 and 18 are formed integrally with each body portion 14 and are spaced apart a short distance in the plane of said body portion. Formed through an appropriate part of each body portion 14 is a shaped aperture 20, the walls of which are adapted to engage with a correspondingly shaped end portion 21 of a drive shaft 22 when assembled for use. The center of the aperture 20 is located, in the illustrated form, at the geometrical center of the semicircular peripheral arc so that the distance from the center of the aperture 20 to the contacting surface of a cable on the pulleylike member is constant. It is to be understood that the center of the aperture 20 could be eccentrically placed with respect to the edge of the pulley without departing from the spirit of this invention.

A circular aperture 24 is formed through one preselected part of each body portion 14 and a transversely formed hollow lug 25 extends in a direction opposite to the direction of the peripheral flange 15. The position of each lug 25 and each aperture 24 is such that when the body portions 14 of the two mating parts 12 and 13 are brought together face to face, the lug 25 of one part will pass through the aperture 24 of the other part and vice versa. The two parts 12 and 13 are made from the same die and are identical in construction so that reversing one of the parts makes an equal and opposite part for assembling with the first part to form the pulleylike member.

The annular flanges 15 formed on the edges of the parts 12 and 13 are shaped in such a way that the base or bottom wall portion 27 is formed substantially flat and extends substantially at a right angle to the body portion 14 of each part. The outer end of the base or bottom wall 27 flows smoothly into the side wall 28 which in cross section (FIGURE 3) is curved first outwardly and then inwardly such as to create an outer edge 30 overhanging or overlapping a limited portion of the bottom wall 27 of the flange 15.

An elongate rim or raceway member 32 is stamped or formed from sheet material or the like and has a pair of spaced-apart grooves 33 and 34 shaped into the flat surface thereof in substantially parallel relation to each other along the length of said member. A pair of ears 36 extend outwardly beyond the side edges 37 of each end portion of the rim member 32 in such a way as to form longitudinally spaced abutments 38 on each side thereof. The rim member 32 is shaped in a substantially circular form with a radius of curvature substantially equaling the radius of curvature of the peripheral edge of the mating parts 12 and 13. In assembling the parts of the pulleylike member, the rim member 32 is placed upon the bottom wall 27 of one part 12 with the abutments 38 overhanging the ends of the flange. The other part 13 is brought into engagement therewith by passing the respective lugs 25 through the respective apertures 24 with the abutments 38 on the opposite side of the member engaging with the ends of the flange on said part 13.

A simple peening operation on the outer end of each lug 25 folds the material of the lug over into engagement with the outer face of the respective parts 12, 13 so as to hold the parts assembled relative to each other and to hold the rim member 32 in operative position with respect to the parts.

With the parts 12 and 13 assembled together about the rim member 32, the overhanging edges 30 of the flanges 15 prevent the rim member 32 from radial removal with respect to the pulleylike member while the ears 36 on the rim member 32 prevent relative rotatable movement between the rim member 32 and the body portions 14 of parts 12, 13. The rim member 32 is adapted to seat upon the respective flat bottom walls or seats 27 of the flanges 15 of parts 12 and 13 to form a backing for the rim member for a purpose to be obvious hereinafter.

The pulley of the instant invention has many uses in many different devices but as herein shown, for the purposes of illustration, it is assembled with a reciprocating link member 40 which can be attached to a motor or the like. The pulleylike member 10 is rigidly attached to the end of the pivot shaft 22 for simultaneous movement therewith about the longitudinal axis of said shaft. A cable member 42 has one end portion 43 fastened by means of lug 44 to the outer end of the link 40. From said end portion 43 the cable 42 extends into engagement with one groove 33 in the rim member 32 of the pulley and partially encircles the pulley. The cable 42 passes between the oppositely disposed ears 17 and 18, engages in the other groove 34 in the rim member, and passes the rest of the way around the pulleylike member 10. The other end portion 45 of the cable is fastened by means of clip 46 to an intermediate portion 47 of the link. A stop lug 48 is fastened to an intermediate portion of the cable 42 and fits between the inner edges of the ears 17 and 18 so as to prevent sliding movement of the cable relative to the pulley.

As the link member 40 is reciprocated in a linear path, first one portion of the cable wraps itself into one of the grooves in the rim member of the pulley as another portion of the cable unwraps with respect to the other groove in said rim member. The wrapping and unwrapping of the cable relative to the grooves in the pulley causes the pulley to oscillate about the axis of the shaft. Since each end of the cable rides in its own groove in the rim member, there is no abrading action between overlapping portions of the cable nor is there binding between the cable and the depression created by the assembly of the mating parts of the pulley.

In the illustrated form of the invention, the curved side walls 28 of the flanges 15 of the pulley engage in the shaped walls of the end portion of the link 40 so as to add stability and smoothness to the motion conversion from the link to the pivot shaft.

It is believed to be obvious that the mating parts 12 and 13 of the pulley can be readily stamped from flat sheet stock such as metal or the like in a highly efficient and inexpensive operation. Likewise, the rim member 32 can be formed in a simple stamping operation wherein the ears 36 forming the abutments 38 and the grooves 33 and 34 are simultaneously formed in one operation.

It is to be understood that the pulleylike member could be made in a complete circle or in any desired segment of a circle, as well as being shaped as an ellipse or the like, without departing from the spirit of the invention. The extent or shape of the peripheral surface depends upon the contact required and the amount of angular movement to be imparted to the shaft 22.

Having thus described my invention, it is obvious that various modifications may be made in the same without departing from the spirit of the invention; and, therefore, I do not wish to be understood as limiting myself to the exact form, construction, arrangement and combination of parts herein shown and described.

I claim:

1. A method of constructing a cable-driven assembly comprising:

forming body members with a peripheral portion describing an incompletely closed curve, forming from flat stock an elongate member with a pair of longitudinally extending substantially parallel cable-receiving grooves, curing said elongate member to conform generally to the incompletely closed curve peripheral portion of said body members and applying the curved elongate member to the incompletely closed curve peripheral portion of said body members and securing said body members together with said elongate member therebetween, and bending ends of the curved elongate member for holding relationship with ends of said incompletely closed curve peripheral portion to prevent relative peripheral movement therebetween.

2. A method of constructing a cable-driven assembly comprising:

forming from flat stock a pair of body portions with peripheral flange portions extending partly therearound and describing an incompletely closed curve, securing said body portions together to form a support member with a peripheral flange portion extending partly therearound and describing an incompletely closed curve, forming from flat stock an elongate member with a pair of longitudinally extending substantially parallel cable-receiving grooves, curving said elongate member to conform generally to the incompletely closed curve peripheral flange portion of said support member and applying the curved elongate member to the incompletely closed curve peripheral flange portion of said support member, and bending the ends of the curved elongate member inwardly between the ends of said incompletely closed curve peripheral flange portion of said support member to secure the curved elongate member to the support member.

3. The method of constructing a pulley comprising the steps of:
forming a pair of body members into a shape wherein a flange portion extends around less than the complete periphery of each body,
forming shoulder means adjacent the termination of each flange portion,
curving an outer portion of each flange inwardly to form a radial load-carrying surface on its radial most periphery,
shaping a rim member to conform generally to the periphery of the body members adjacent said flange portions and terminating its ends short of a closed curve,
placing said rim member between said flange portions and securing the body members together to form a pulley with the curved outer portions of each flange facing inwardly,
and deforming portions of the rim member into holding relationship with said shoulder means.

4. The method of constructing a pulley comprising the steps of:
forming a pair of body members each having flanges around a portion of the periphery thereof,
forming each flange with a seat for receiving a rim and curving an outer portion of each flange laterally to define a radial load-carrying surface,
shaping a rim member to conform to the circumferential shape of said seat,
placing the rim member between the flanges of the pair of body members,
securing the body members together with outer portions of each said flange curving toward the other,
and bending ends of the rim member toward each other for holding relationship with portions of the flanges so as to prevent relative peripheral movement therebetween and for directing portions of a cable from one bent end toward the other bent end.

References Cited in the file of this patent
UNITED STATES PATENTS

| | | |
|---|---|---|
| 2,469,949 | Cantrell | May 10, 1949 |
| 2,655,813 | Howell | Oct. 20, 1953 |